US012111715B2

(12) United States Patent
Yen et al.

(10) Patent No.: US 12,111,715 B2
(45) Date of Patent: Oct. 8, 2024

(54) MEMORY STRUCTURE

(71) Applicant: TEAM GROUP INC., New Taipei (TW)

(72) Inventors: Yu Hsuan Yen, New Taipei (TW); Hsi Lin Kuo, New Taipei (TW); Wei Hsiang Wang, New Taipei (TW); Chin Feng Chang, New Taipei (TW)

(73) Assignee: TEAM GROUP INC., New Taipei (TW)

( * ) Notice: Subject to any disclaimer, the term of this patent is extended or adjusted under 35 U.S.C. 154(b) by 148 days.

(21) Appl. No.: 18/105,258

(22) Filed: Feb. 3, 2023

(65) Prior Publication Data

US 2024/0211015 A1    Jun. 27, 2024

(30) Foreign Application Priority Data

Dec. 27, 2022  (TW) .................................. 111150169

(51) Int. Cl.
*G06F 1/3234*  (2019.01)
*G06F 1/3296*  (2019.01)
(52) U.S. Cl.
CPC .......... *G06F 1/3275* (2013.01); *G06F 1/3296* (2013.01)

(58) Field of Classification Search
CPC .... G06F 1/3275; G06F 1/3296; G06F 1/3234; G06F 1/325
See application file for complete search history.

(56) References Cited

U.S. PATENT DOCUMENTS 10,963,419 B1\* 3/2021 Chin ........................ G06F 13/24
2023/0011582 A1\* 1/2023 Kim ........................ G11C 5/147

\* cited by examiner

*Primary Examiner* — Raymond N Phan
(74) *Attorney, Agent, or Firm* — WPAT, P.C

(57) ABSTRACT

The present invention provides a memory structure, which is disposed on a first circuit board and connected electrically to a system power supply of a second circuit board. The memory structure comprises a plurality of memory unit, a power control component, and a display component. The power control component receives a first voltage of the system power supply. The power control component includes a power management unit and a linear voltage stabilizing unit. The display component includes a light-emitting unit and a control unit. The power control component provides a second voltage to the plurality of memory units using the power management unit. The linear voltage stabilizing unit provides a third voltage to the light-emitting unit and the control unit. The power management unit distributes the power supply to the plurality of memory units, the light-emitting unit, and the control unit for further usage.

10 Claims, 5 Drawing Sheets

MEMORY STRUCTURE

BACKGROUND OF THE INVENTION

Random-access memories (RAM) are the memories that exchange data directly with the CPU. They can be read and write at any time with high speed and normally used as the temporary data storage media of the operating system or other executing programs.

RAMs can be further classified into static random-access memory (SRAM) and dynamic random-access memory (DRAM). SRAMs own the advantage of fast access. Unfortunately, their manufacturing cost is higher. They are normally used as cache memories. On the other hand, DRAMs have lower price per unit capacity. Thereby, they are massively adopted as the main memory of a system and are normal memory devices at present.

DRAM is a semiconductor memory with the main principle of using the number of charges stored in capacitors for representing binary 1 or 0. Nonetheless, in practice, owing to the existence of leakage current, the number of charges stored in capacitors is not sufficient for correct judgement of data and leading to data damage. Thereby, for DRAMs, periodic charging is indispensable. Due to the periodic refreshing property, they are called "dynamic" memories.

Given the drawbacks of DRAM, the synchronous dynamic random-access memory (SDRAM) is gradually developed in the industry. SDRAM is a DRAM that adopts a synchronous timer for controlling the input/output signals of a memory. Based in the architecture of DRAM, SDRAM includes synchronous and dual-bank functions additionally so that the microprocessor can be synchronous with the clock of the SDRAM. Consequently, compared to a DRAM, an SDRAM can save more time in executing commands and transmitting data.

Nowadays, SDRMs have been developed to DDR5. The power IC of the memory module has been integrated into the DDR5 memory module, as compared to on the mainboard in DDR4. In addition, as the frequency of memory becomes higher, the demand on capacity will be larger, which results in temperature rising in DDR5 memory module products. Moreover, the light-emitting function of modern SDRAMs also generates more heat in memory devices. By increasing the temperature, the performance of memories will decrease, and the power consumption will increase. Thereby, it is required in the industry to have a memory structure that can reduce power consumption and device temperature.

To solve to above technical problem according to the prior art, the present invention provides a memory structure including power control components. The voltage of the system power supply is distributed according to device types, including a plurality of memory units, a light-emitting unit, and a control unit. By distributing power using this structure, the power consumption of devices can be reduced, and the heat generated by devices can be further lowered.

SUMMARY OF THE INVENTION

An objective of the present invention is to provide a memory structure. A power control component id disposed on a first circuit board. The power control component redistribute the voltage of the system power supply to a plurality of memory units, a light-emitting unit, and a control unit. By distributing power using this structure, the power consumption of devices can be reduced, and the heat generated by devices can be further lowered.

To achieve the above objective and efficacy, the present invention provides a memory structure, which is disposed on a first circuit board. The first circuit board is disposed on a second circuit board. The memory structure is connected electrically to a system power supply of the second circuit board. The memory structure comprises a plurality of memory units, a power control component, and a display component. The plurality of memory units are disposed on the first circuit board, respectively. The power control component is disposed on the first circuit board ad receives a first voltage of the system power supply. The power control component includes a power management unit and a linear voltage stabilizing unit. The power management unit is connected electrically to the plurality of memory units. The display component is disposed on the first circuit board and includes a light-emitting unit and a control unit. The light-emitting unit and the control unit are connected electrically to the linear voltage stabilizing unit. The power management unit outputs a second voltage to the plurality of memory units. The linear voltage stabilizing unit outputs a third voltage to the light-emitting unit and the control unit. By using this structure, the power consumption of the memory can be further reduced.

According to an embodiment of the present invention, the first voltage is greater than the third voltage, and the third voltage is greater than the second voltage.

According to an embodiment of the present invention, the light-emitting unit is a light-emitting diode.

According to an embodiment of the present invention, the memory structure further comprises a signal processing component disposed on the first circuit board. The signal processing component includes a first signal processing unit and a second signal processing unit. The first signal processing unit is connected electrically to the control unit and transmits a first output signal. The second signal processing unit is connected electrically to the control unit and transmits a second output signal.

According to an embodiment of the present invention, the signal processing component further includes a voltage detection device connected electrically to the first signal processing unit and the second signal processing unit.

According to an embodiment of the present invention, the voltage detection device receives an integrated-circuit signal and transmits the integrated-circuit signal to the first signal processing unit or the second signal processing unit correspondingly.

According to an embodiment of the present invention, the voltage detection device is connected electrically to a high speed download packet access (HSDA) for transmitting the integrated-circuit signal.

According to an embodiment of the present invention, the voltage detection device is connected electrically to a high speed communication line (HSCL) for transmitting the integrated-circuit signal.

According to an embodiment of the present invention, the control unit transmits a control signal to the light-emitting unit corresponding to the first output signal and the second output signal.

According to an embodiment of the present invention, the first circuit board is a first printed circuit board (PCB).

DETAILED DESCRIPTION OF THE INVENTION

In order to make the structure and characteristics as well as the effectiveness of the present invention to be further understood and recognized, the detailed description of the present invention is provided as follows along with embodiments and accompanying figures.

The present invention provides a memory structure comprising a plurality of memory units, a power control component, and a display component. The power control component is used to receive the electrical energy of the system power supply. The power control component includes a power management unit and a linear voltage stabilizing unit. The power management unit is connected electrically to the plurality of memory unit. The display component includes a light-emitting unit and a control unit. The light-emitting unit and the control unit are connected electrically to the linear voltage stabilizing unit. The power management unit of the power control component provides a voltage to the plurality of memory units. The linear voltage stabilizing unit provides another voltage to the light-emitting unit and the control unit. By distributing the power supply to different devices, the power consumption of devices can be further reduced.

Figure 1:
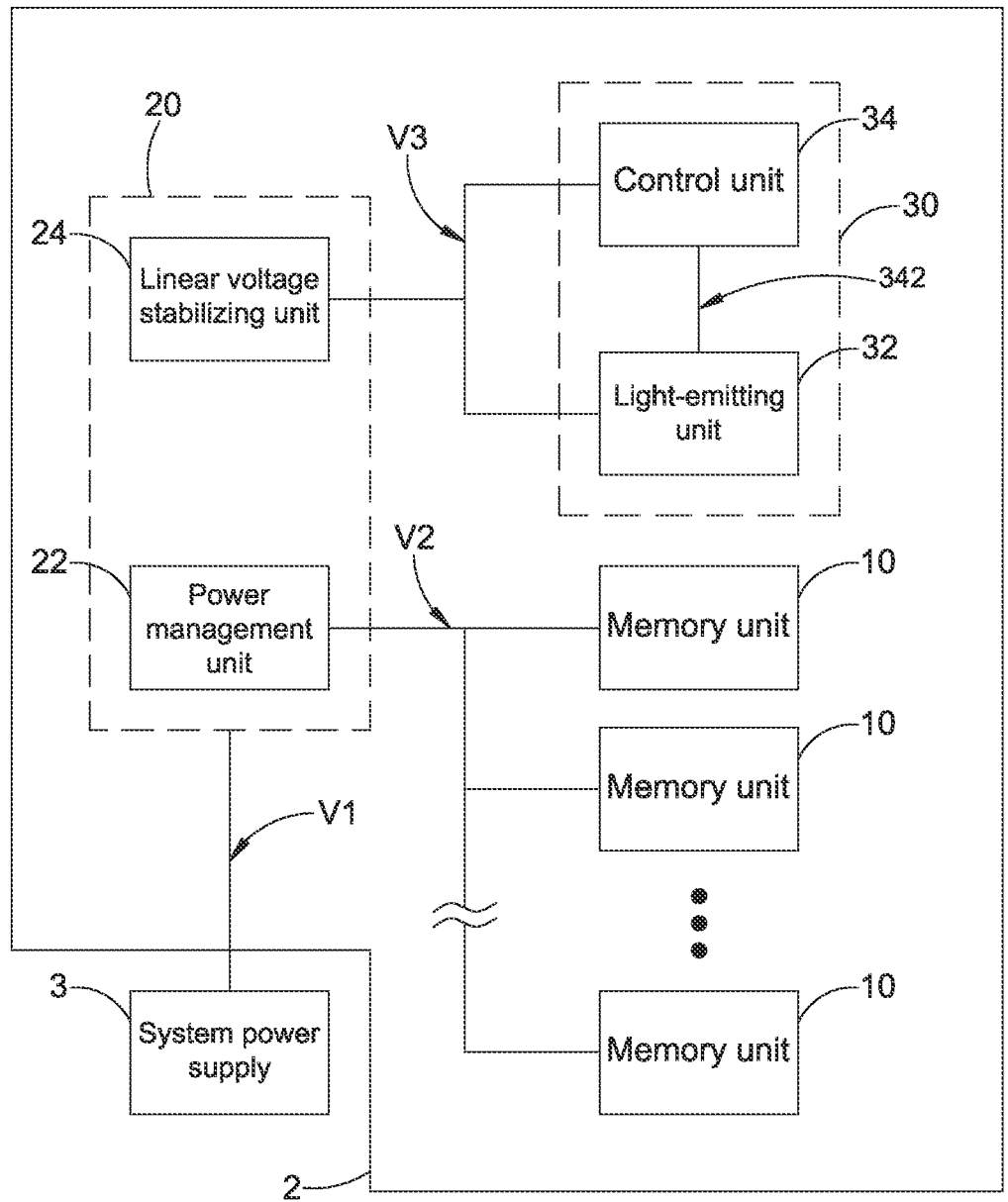
FIG. 1 shows a structural schematic diagram according to an embodiment of the present invention.

Please refer to FIG. 1, which shows a structural schematic diagram according to an embodiment of the present invention. As shown in the figure, according to the present embodiment, a memory structure 1 is disposed on a first circuit board 2. The first circuit board 2 is disposed on a second circuit board (not shown in the figure). The memory structure 1 is connected electrically to a system power supply 3 of the second circuit board for receiving the electrical energy of the system power supply 3. The memory structure 1 comprises a plurality of memory unit 10, a power control component 20, and a display component 30.

Please refer again to FIG. 1. As shown in the figure, according to the present embodiment, the plurality of memory units 10 are disposed on the first circuit board 2, respectively. The power control component 20 is disposed on the first circuit board 2 and receives a first voltage V1 of the system power supply 3. The power control component 20 includes a power management unit 22 and a linear voltage stabilizing unit 24. The power management unit 22 is connected electrically to the plurality of memory units 10.

The display component 30 is disposed on the first circuit board 2. In addition, the display component 30 includes a light-emitting unit 32 and a control unit 34. The light-emitting unit 32 and the control unit 34 are connected electrically to the linear voltage stabilizing unit 24.

After the power management unit 22 receives the first voltage V1 of the system power supply 3, the power management unit 22 outputs a second voltage V2 to the plurality of memory units 10. Meanwhile, after the linear voltage stabilizing unit 24 receives the first voltage V1, the linear voltage stabilizing unit 24 outputs third voltage V3 to the light-emitting unit 32 and the control unit 34.

According to the present embodiment, the first voltage V1 is greater than the third voltage V3; the third voltage V3 is greater than the second voltage V2. The power control component 20 distributes the electrical energy of the system power supply 3 to the plurality of memory units 10 according to the second voltage V2 correspondingly and to the light-emitting unit 32 and the control unit 34 according to the third voltage V3 correspondingly. For example, when the first voltage V1 of the system power supply 3 is 5V, the power management unit 22 of the power control component 20 outputs the second voltage V2 as 1.1V; the linear voltage stabilizing unit 24 of the power control component 20 outputs the third voltage V3 as 3V. Thereby, the power consumption of the plurality of memory units 10, the light-emitting unit 32, and the control unit 34 can be reduced.

According to an embodiment, the second circuit board is the mainboard of personal computers, notebook computers, or servers. The second circuit board also includes the power management unit for supplying power to devices, such as CPUs and southbridge and northbridge chipsets. The memory structure 1 controls the light-emitting unit 32 via the control signal. The first circuit board 2 is supplied by the second circuit board only. The power control component 20 of the first circuit board, instead of the power control component 20 of the second circuit board, manages the power supply to the plurality of memory units 10, the light-emitting unit 32, and the control unit 34.

According to an embodiment, the first circuit board 2 is a first printed circuit board (PCB). The memory structure 1 is disposed on the first circuit board 2 to form the fifth-generation double-data-rate synchronous dynamic random-access memory (DDR5 SDRAM). Nonetheless, the present invention is not limited to the embodiment.

According to an embodiment, the light-emitting unit 32 is a light-emitting diode (LED) or a plurality of LEDs including red, green, and blue colors. Nonetheless, the present invention is not limited to the embodiment.

According to an embodiment, the power management unit 22 is a power management IC (PMIC) used for controlling the flowrate and direction of the power supply for reducing the power consumption of devices as required by the main system.

According to an embodiment, the linear voltage stabilizing unit 24 is low dropout (LDO), making it also named low-loss linear voltage stabilizer, low-saturation linear voltage stabilizer, or low dropout voltage stabilizer. It enables low voltage difference between the input and the output.

Figure 2:
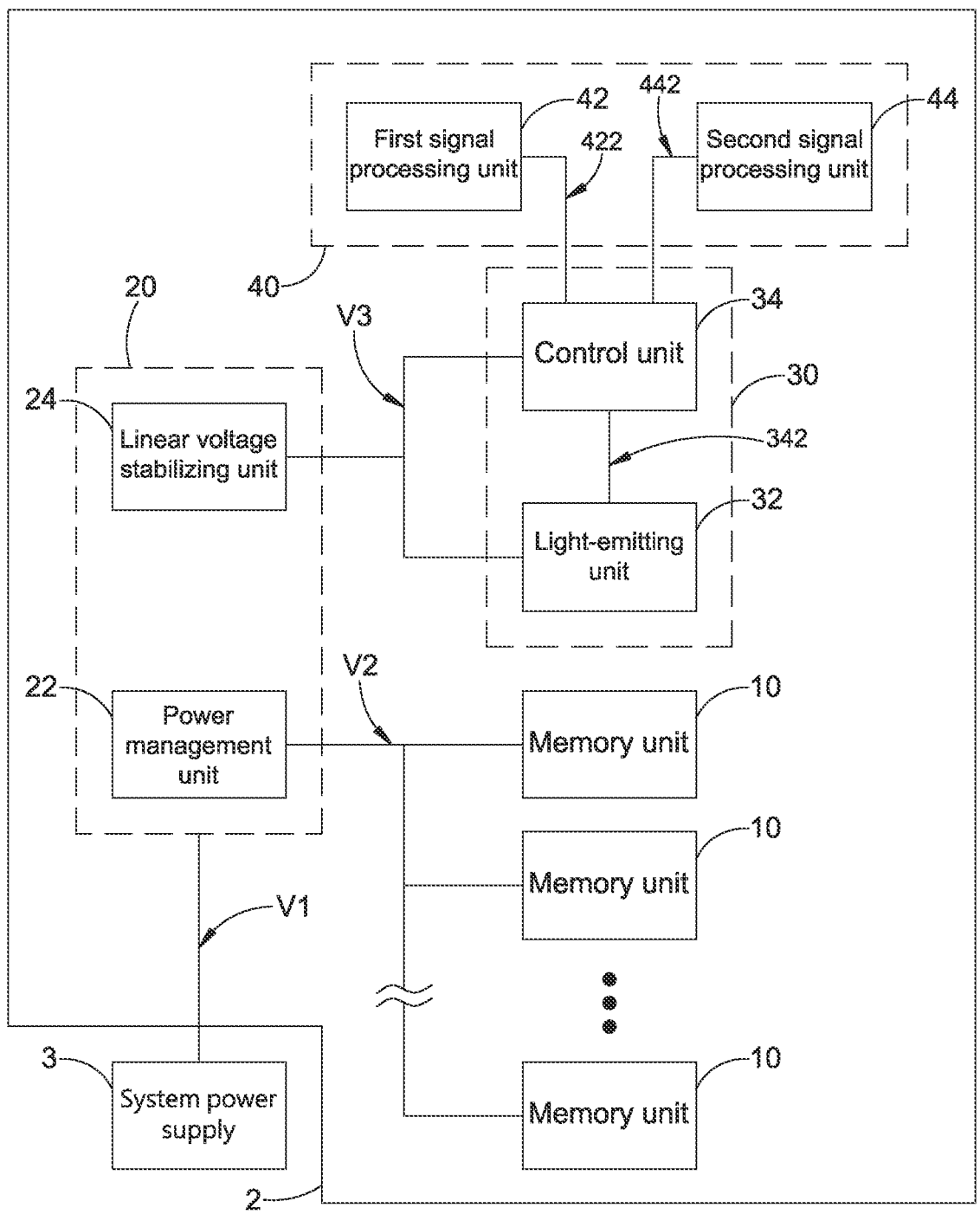
FIG. 2 shows a structural schematic diagram according to another embodiment of the present invention.

Please refer to FIG. 2, which shows a structural schematic diagram according to another embodiment of the present invention. As shown in the figure, the present embodiment is based on the previous embodiment. According to the present embodiment, the memory structure 1 further comprises a signal processing component 40 disposed on the first circuit board 2. The signal processing component 40 includes a first signal processing unit 42 and a second signal processing unit 44. The first signal processing unit 42 is connected electrically to the control unit 34. The first signal processing unit 42 transmits a first output signal 422 to the control unit 34. The second signal processing unit 44 is connected electrically to the control unit 34. The second signal processing unit 44 transmits a second output signal 442 to the control unit 34. The control unit 34 transmits a control signal 342 to the light-emitting unit 32 according to the first output signal 422 or the second output signal 442 to enable the light-emitting unit 32 to emit light and display pattern variation correspondingly. The connection of other devices according to the present embodiment is identical to the previous embodiment. Hence, the details will not be repeated.

Figure 3:
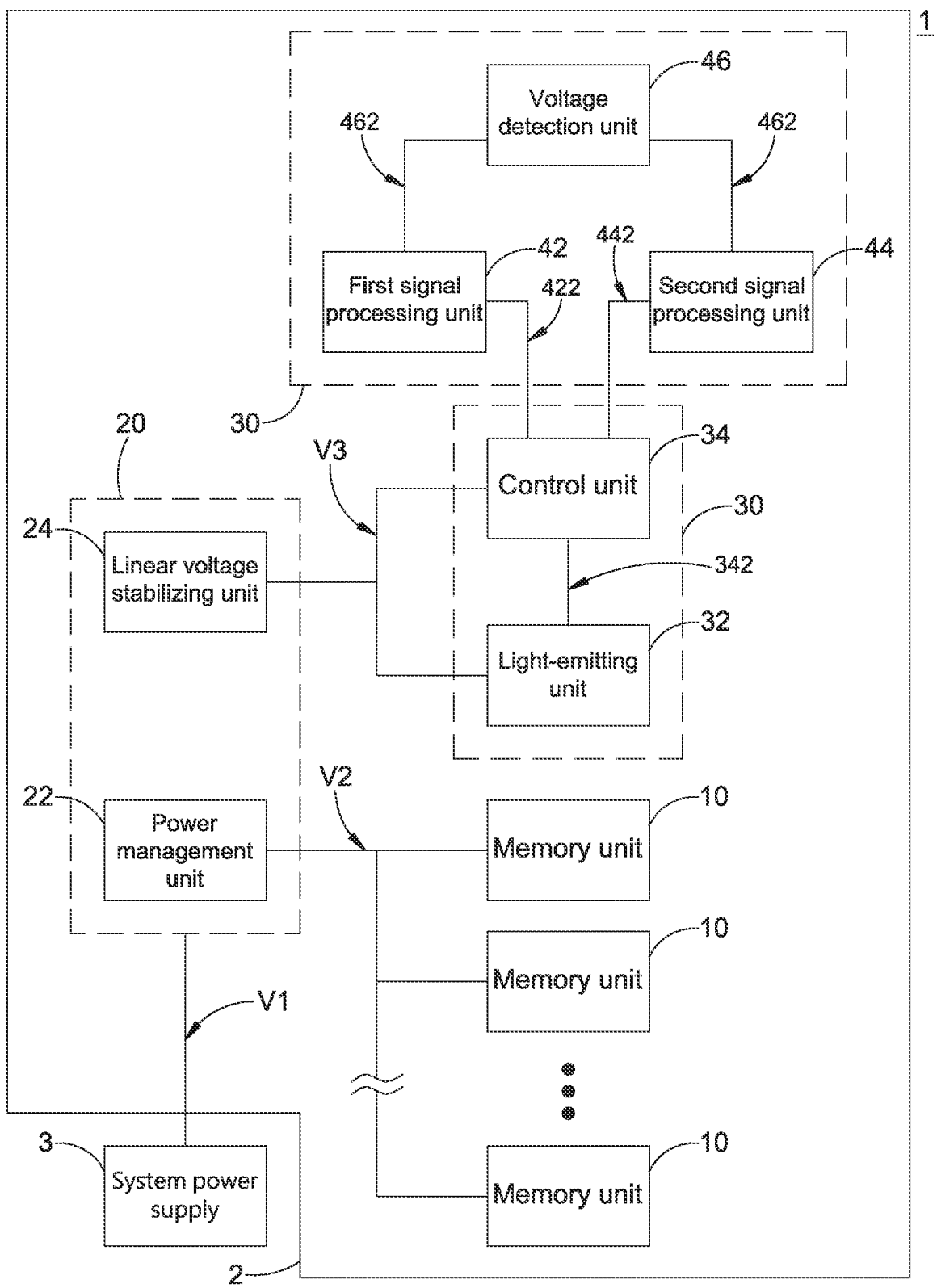
FIG. 3 shows a structural schematic diagram of the voltage detection device according to another embodiment of the present invention.

Please refer to FIG. 3, which shows a structural schematic diagram of the voltage detection device according to another embodiment of the present invention. As shown in the figure, the present embodiment is based on the previous embodiment. According to the present embodiment, the signal processing component 40 further includes a voltage detection device 46 connected electrically to the first signal processing unit 42 and the second signal processing unit 44. The voltage detection device 46 receives an integrated-circuit signal 462 and transmits the integrated-circuit signal 462 to the first signal processing unit 42 or the second signal processing unit 44 correspondingly.

Figure 5:
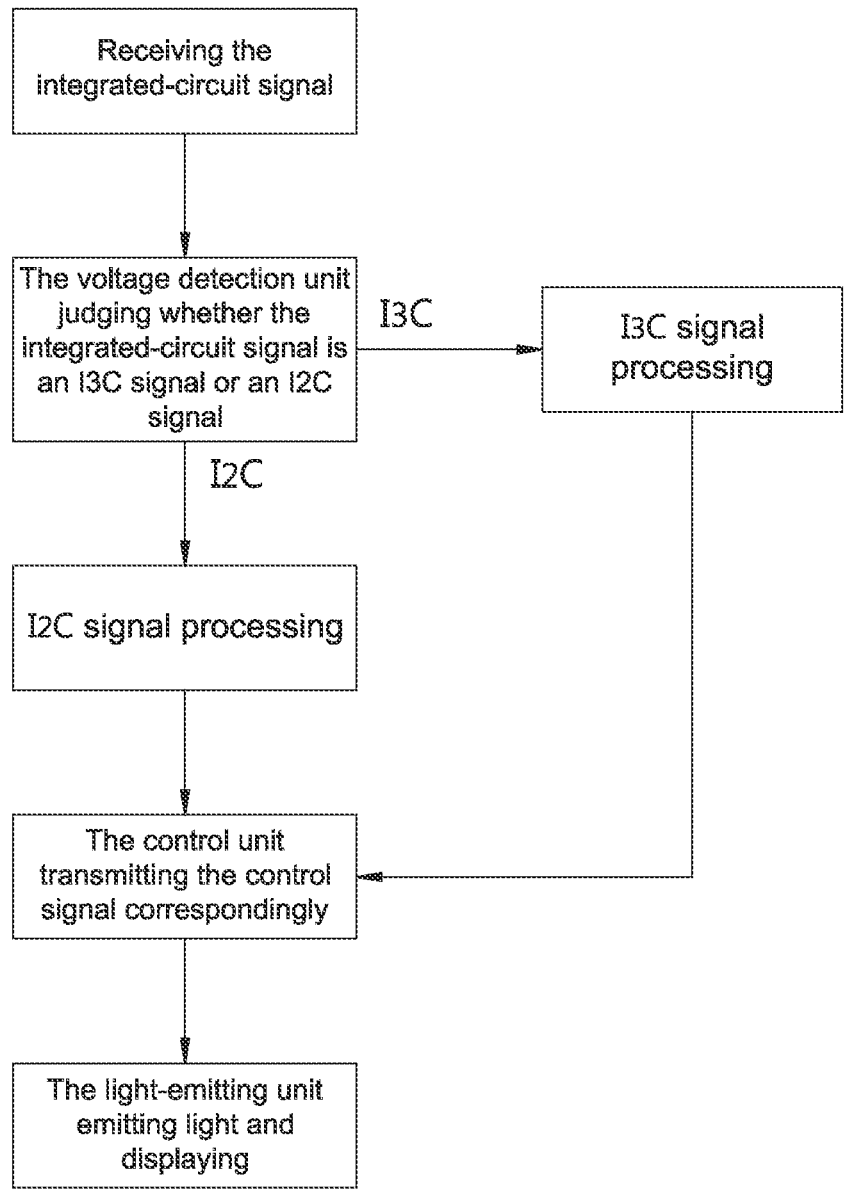
FIG. 5 shows a schematic diagram of signal judgement according to another embodiment of the present invention.

Please refer to FIG. 3 again and to FIG. 5, which shows a schematic diagram of signal judgement according to another embodiment of the present invention. As shown in the figure, according to the present embodiment, the integrated-circuit signal 462 is the control signal of the host. According to the present embodiment, the integrated-circuit signal 462 is a I3C signal or a I2C signal. Thereby, according to the present embodiment, the first signal processing unit 42 is an I2C signal processing unit while the second signal processing unit 44 is an I3C signal processing unit.

After the voltage detection device 46 receives the integrated-circuit signal 462, it judges whether the integrated-circuit signal 462 is an I3C signal or an I2C signal. When the integrated-circuit signal 462 is an I2C signal, the voltage detection device 46 transmits the integrated-circuit signal 462 to the first signal processing unit 42 for I2C signal processing to form the first output signal 422. The control unit 34 then transmits the control signal 342 to the light-emitting unit 32 according to the first output signal 422 to enable the light-emitting unit 32 to emit light or display pattern variation correspondingly. When the integrated-circuit signal 462 is an I3C signal, the voltage detection device 46 transmits the integrated-circuit signal 462 to the second signal processing unit 44 for I3C signal processing to form the second output signal 442. The control unit 34 then transmits the control signal 342 to the light-emitting unit 32 according to the second output signal 442 to enable the light-emitting unit 32 to emit light or display pattern variation correspondingly. Thereby, the light-emitting unit 32 is driven to emit, for example, blue and green variation according to the I2C signal or red and yellow variation according to the I3C signal. Nonetheless, the present invention is not limited to the embodiment.

Figure 4:
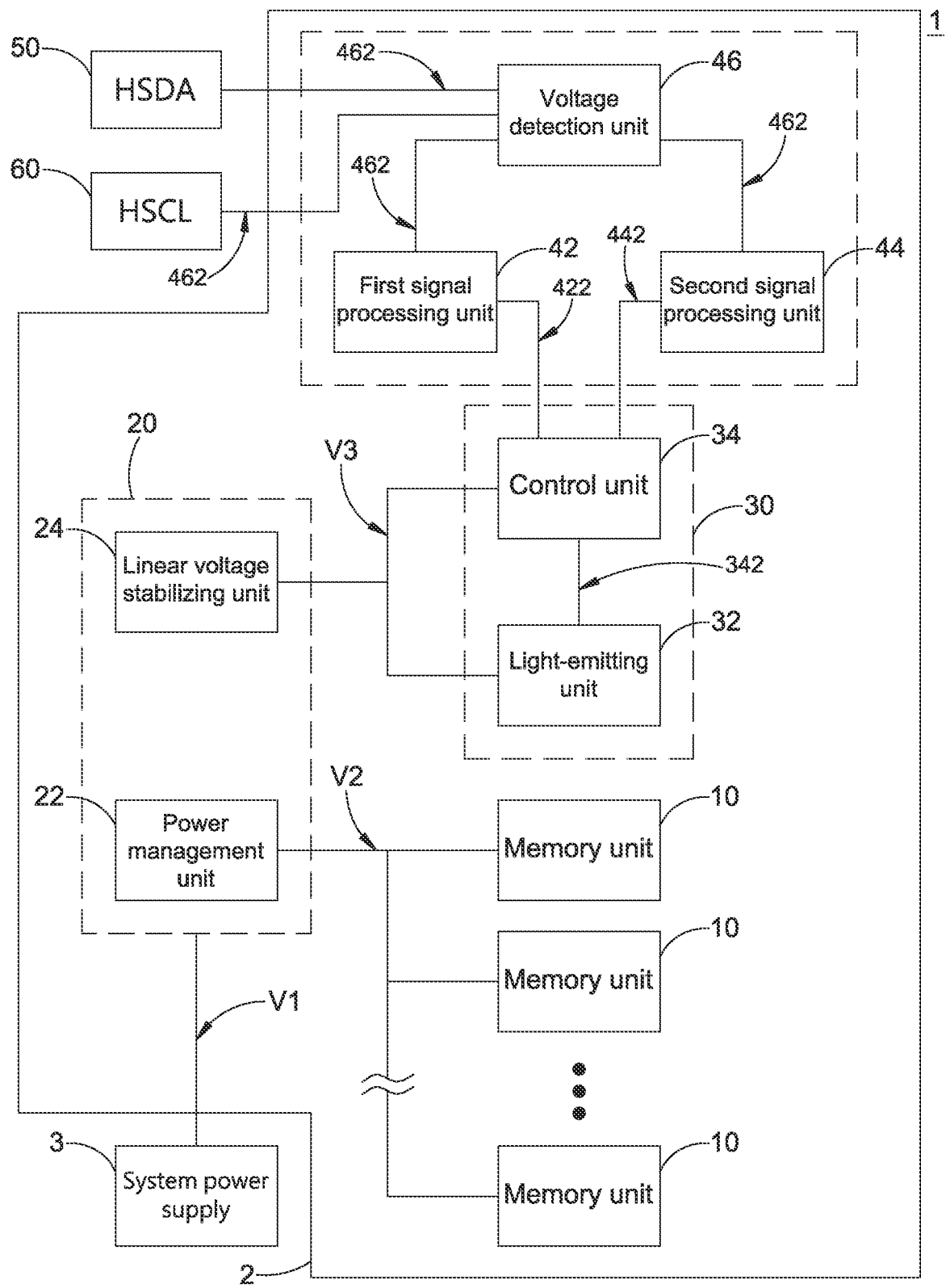
FIG. 4 shows another structural schematic diagram according to another embodiment of the present invention.

Please refer to FIG. 4, which shows another structural schematic diagram according to another embodiment of the present invention. As shown in the figure, the present embodiment is based on the previous embodiment. According to the present embodiment, the voltage detection device 46 is connected electrically to an HSDA 50, an HSCL 60, or both. The HSDA 50 and the HSCL 60 are used for transmitting the integrated-circuit signal 462 to the voltage detection device 46 so that the program of the host can control the variation and shutoff of the light-emitting unit 32.

To sum up, the present invention provides a memory structure, which comprises a plurality of memory units, a power control component, and a display component. The power management unit of the power control component receives the electrical energy of the system power supply and provides a voltage to the plurality of memory units. The linear voltage stabilizing unit of the power control component provides another voltage to the light-emitting unit and the control unit. The voltages are adjusted and distributed to different devices according to requirements for reducing the power consumption and heat of the devices. Then the problem of increased temperature, which will degrade memory performance and increase power consumption, in memories due to higher frequencies and larger capacity according to the prior art can be solved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A memory structure, disposed on a first circuit board connected electrically to a second circuit board, connected electrically to a system power supply of said second circuit board, and comprising:
   a plurality of memory units, disposed on said first circuit board, respectively;
   a power control component, disposed on said first circuit board, receiving a first voltage of said system power supply, including a power management unit and a linear voltage stabilizing unit, and said power management unit connected electrically to said plurality of memory units; and
   a display component, disposed on said first circuit board, including a light-emitting unit and a control unit, said light-emitting unit and said control unit connected electrically to said linear voltage stabilizing unit;
   where said power management unit outputs a second voltage to said plurality of memory units, and said linear voltage stabilizing unit outputs a third voltage to said light-emitting unit and said control unit.

2. The memory structure of claim 1, wherein said first voltage is greater than said third voltage, and said third voltage is greater than said second voltage.

3. The memory structure of claim 1, wherein said light-emitting unit is a light-emitting diode.

4. The memory structure of claim 1, and further comprising a signal processing component, disposed on said first circuit board, including a first signal processing unit and a second signal processing unit, said first signal processing unit connected electrically to said control unit and transmitting a first output signal, and said second signal processing unit connected electrically to said control unit and transmitting a second output signal.

5. The memory structure of claim 1, wherein said first circuit board is a first printed circuit board (PCB).

6. The memory structure of claim 4, wherein said signal processing component further includes a voltage detection device connected electrically to said first signal processing unit and said second signal processing unit.

7. The memory structure of claim 4, wherein said control unit transmits a control signal to said light-emitting unit corresponding to said first output signal and said second output signal.

8. The memory structure of claim 6, wherein said voltage detection device receives an integrated-circuit signal and transmits said integrated-circuit signal to said first signal processing unit or said second signal processing unit correspondingly.

9. The memory structure of claim 8, wherein said voltage detection device is connected electrically to a high speed download packet access (HSDA) for transmitting said integrated-circuit signal.

10. The memory structure of claim 8, wherein said voltage detection device is connected electrically to a high speed communication line (HSCL) for transmitting said integrated-circuit signal.

* * * * *